United States Patent
Yoshida

(10) Patent No.: US 8,154,955 B2
(45) Date of Patent: Apr. 10, 2012

(54) OBSTACLE DETECTION APPARATUS AND METHOD OF CONTROLLING OBSTACLE DETECTION APPARATUS

(75) Inventor: Toru Yoshida, Kariya (JP)

(73) Assignee: Denso Corporation, Kariya (JP)

( * ) Notice: Subject to any disclaimer, the term of this patent is extended or adjusted under 35 U.S.C. 154(b) by 244 days.

(21) Appl. No.: 12/661,740

(22) Filed: Mar. 23, 2010

(65) Prior Publication Data

US 2010/0246327 A1    Sep. 30, 2010

(30) Foreign Application Priority Data

Mar. 26, 2009  (JP) ................................ 2009-076062

(51) Int. Cl.
*G01S 15/08* (2006.01)
(52) U.S. Cl. ...................................... 367/138
(58) Field of Classification Search .......... 367/98, 367/99, 902; 701/300, 301; 340/435
See application file for complete search history.

(56) References Cited

U.S. PATENT DOCUMENTS

| | | | | | |
|---|---|---|---|---|---|
| 4,974,214 | A | * | 11/1990 | Forster et al. | 367/98 |
| 7,664,600 | B2 | * | 2/2010 | Takeichi et al. | 367/98 |
| 8,031,556 | B2 | * | 10/2011 | Magane et al. | 367/99 |
| 8,081,539 | B2 | * | 12/2011 | Faber et al. | 367/98 |
| 2009/0009306 | A1 | * | 1/2009 | Magane et al. | 340/435 |
| 2010/0214872 | A1 | * | 8/2010 | Schmid et al. | 367/98 |
| 2010/0246327 | A1 | * | 9/2010 | Yoshida | 367/103 |

FOREIGN PATENT DOCUMENTS

JP       06130149 A  *  5/1994
JP    2010230366 A  *  10/2010

* cited by examiner

*Primary Examiner* — Daniel Pihulic
(74) *Attorney, Agent, or Firm* — Harness, Dickey & Pierce, PLC

(57) ABSTRACT

An obstacle detection apparatus includes an ultrasonic sensor and a control part. The ultrasonic sensor detects a presence of an obstacle around a vehicle and a distance to the obstacle by transmitting an ultrasonic wave and receiving the ultrasonic wave reflected by the obstacle. The control part includes at least one of a rainfall amount determining portion and a noise determining portion. When the rainfall determining portion determines that a rainfall amount is greater than a predetermined amount or when the noise determining portion determines that noise is present, the control part outputs a command signal to the ultrasonic sensor so that the ultrasonic sensor decreases a directivity compared with a case where the rainfall determining portion determines that the rainfall amount is less than or equal to the predetermined amount or a case where the noise determining portion determines that noise is not present.

5 Claims, 11 Drawing Sheets

8,154,955 B2

OBSTACLE DETECTION APPARATUS AND METHOD OF CONTROLLING OBSTACLE DETECTION APPARATUS

CROSS REFERENCE TO RELATED APPLICATIONS

The present application is based on and claims priority to Japanese Patent Application No. 2009-76062 filed on Mar. 26, 2009, the contents of which are incorporated in their entirety herein by reference.

BACKGROUND OF THE INVENTION

1. Field of the Invention

The present invention relates to an obstacle detection apparatus for a vehicle. The present invention also relates to a method of controlling an obstacle detection apparatus for a vehicle.

2. Description of the Related Art

An obstacle detection apparatus for a vehicle detects an obstacle around the vehicle using an ultrasonic sensor. The ultrasonic sensor transmits an ultrasonic wave and receives a reflected wave that is the ultrasonic wave reflected by an obstacle. Then, the ultrasonic sensor detects a presence of an obstacle and a distance to the obstacle. When the ultrasonic sensor detects an obstacle, the obstacle detection apparatus generates a warning sound.

US 2009/0009306 A1 (corresponding to JP-A-2009-14560) discloses an obstacle detection apparatus including an ultrasonic sensor and an electronic control unit (ECU). The ultrasonic sensor is disposed at a bumper, for example. The ultrasonic sensor includes a microphone having an oscillation surface. The ultrasonic sensor is configured so that a directivity and a detection distance are variable. The ECU receives signals from a speed sensor, a transmission device, and a clearance sonar activation switch. Based on the received signals, the ECU outputs a command signal to the ultrasonic sensor to change the directivity and the detection distance.

For example, when the ECU receives a signal indicating a vehicle speed from the speed sensor, the ECU compares the vehicle speed with a threshold value. When the ECU determines that the vehicle speed is greater than the threshold value, the ECU outputs a long-distance mode setting command to the ultrasonic sensor. Then, the ultrasonic sensor is set to a long distance mode and detects an obstacle. In the long distance mode, the directivity is low and the detection distance is long. In contrast, when the ECU determines that the vehicle speed is less than or equal to the threshold value, the ECU outputs a short-distance mode setting command to the ultrasonic sensor. Then, the ultrasonic sensor is set to a short distance mode and detects an obstacle. In the short distance mode, the directivity is high and the detection distance is short.

The above-described obstacle detection apparatus changes the directivity and the detection distance based on the vehicle speed. When the vehicle speed is greater than the threshold value, the obstacle detection apparatus can detect an obstacle away from the vehicle. Thus, the obstacle detection apparatus can warn early when an obstacle comes close to the vehicle. When the vehicle speed is less than or equal to the threshold value, the obstacle detection apparatus detects only an obstacle in the vicinity of the vehicle. Thus, the obstacle detection apparatus is restricted from warning that an obstacle comes close to the vehicle too early.

When the ultrasonic sensor is set to the short distance mode having the high directivity, the ultrasonic sensor is liable to detect noise compared with a case where the ultrasonic sensor is set to the long distance mode having the low directivity.

In FIG. 12A, a detection area in the short distance mode is shown by area XIIa, and a detection area in the long distance mode is shown by area XIIb. When the obstacle detection apparatus performs an obstacle detection in the short distance mode having the high directivity, the obstacle detection apparatus is liable to detect noise. Therefore, the obstacle detection apparatus is liable to make a false detection in which noise is detected as a reflected wave reflected by an obstacle by error compared with a case where the obstacle detection apparatus performs the obstacle detection in the long distance mode.

In the above-described obstacle detection apparatus, the ultrasonic sensor is attached, for example, to the bumper. Thus, the oscillation surface is exposed to an outside of the vehicle. When it rains, a raindrop may adhere to the oscillation surface. If the ultrasonic sensor executes the obstacle detection in the short distance mode having the high directivity when it rains, an oscillation motion of the oscillation surface may be reduced due to a raindrop, and the directivity is further increased. A directivity of an ultrasonic sensor depends on a diameter of an oscillation surface and a frequency (wavelength) of a transmission wave, and the directivity can be decreased by increasing the frequency or decreasing the wavelength as described, for example, in DENKI ONKYO SHINDOUGAKU, Corona, 1960, pages 60-62. When the oscillation motion of the oscillation surface is reduced due to a raindrop, the ultrasonic wave is transmitted at a frequency lower than a predetermined frequency. Thus, the directivity becomes higher than a predetermined directivity.

In FIG. 12B, a predetermined detection area in the short distance mode is shown by area XIIc, and a detection area in a case where a raindrop adheres to the oscillation surface is shown by area XIId. If a raindrop adheres to the oscillation surface while the ultrasonic sensor is set to the short distance mode having a high directivity, the directivity may increase from the high directivity and the detection area may include a road surface. If the detection area includes a road surface, the ultrasonic sensor may make a false detection in which a reflected wave from the road surface is detected as a reflected wave from an obstacle by error.

SUMMARY OF THE INVENTION

In view of the foregoing problems, it is an object of the present invention to provide an obstacle detection apparatus that can reduce a false detection. Another object of the present invention is to provide a method of controlling an obstacle detection apparatus that can reduce a false detection.

An obstacle detection apparatus for a vehicle according to an aspect of the present invention includes an ultrasonic sensor and a control part. The ultrasonic sensor is configured to detect a presence of an obstacle around the vehicle and a distance to the obstacle by transmitting an ultrasonic wave and receiving the ultrasonic wave reflected by the obstacle. The ultrasonic sensor has a directivity that is variable and determines a detection area. The control part includes at least one of a rainfall amount determining portion and a noise determining portion. The rainfall amount determining portion is configured to compare a rainfall amount with a predetermined amount. The noise determining portion is configured to determine a presence of noise. When the rainfall determining portion determines that the rainfall amount is greater than the predetermined amount or when the noise determining portion determines that noise is present, the control part outputs a control signal to the ultrasonic sensor so that the ultrasonic sensor decreases the directivity compared with a case where the rainfall determining portion determines that the rainfall amount is less than or equal to the predetermined amount or a case where the noise determining portion determines that noise is not present.

The above-described obstacle detection apparatus can reduce a false detection in which a reflected wave from the road surface or noise is detected as a reflected wave from an obstacle by error.

According to another aspect of the present invention, in a method of controlling an obstacle detection apparatus for a vehicle, a rainfall amount is compared with a predetermined amount. When the rainfall amount is greater than the predetermined amount, a directivity of an ultrasonic sensor is set to a first directivity. When the rainfall amount is less than or equal to the predetermined amount, the directivity of the ultrasonic sensor decreased is set to a second directivity that is higher than the first directivity. An ultrasonic wave is transmitted from the ultrasonic sensor and the ultrasonic wave reflected by an obstacle is received by the ultrasonic sensor.

The above-described method can reduce a false detection in which a reflected wave from the road surface is detected as a reflected wave from an obstacle by error.

BRIEF DESCRIPTION OF THE DRAWINGS

Additional objects and advantages of the present invention will be more readily apparent from the following detailed description of exemplary embodiments when taken together with the accompanying drawings. In the drawings.

DETAILED DESCRIPTION OF THE EXEMPLARY EMBODIMENTS

First Embodiment

Figure 1:
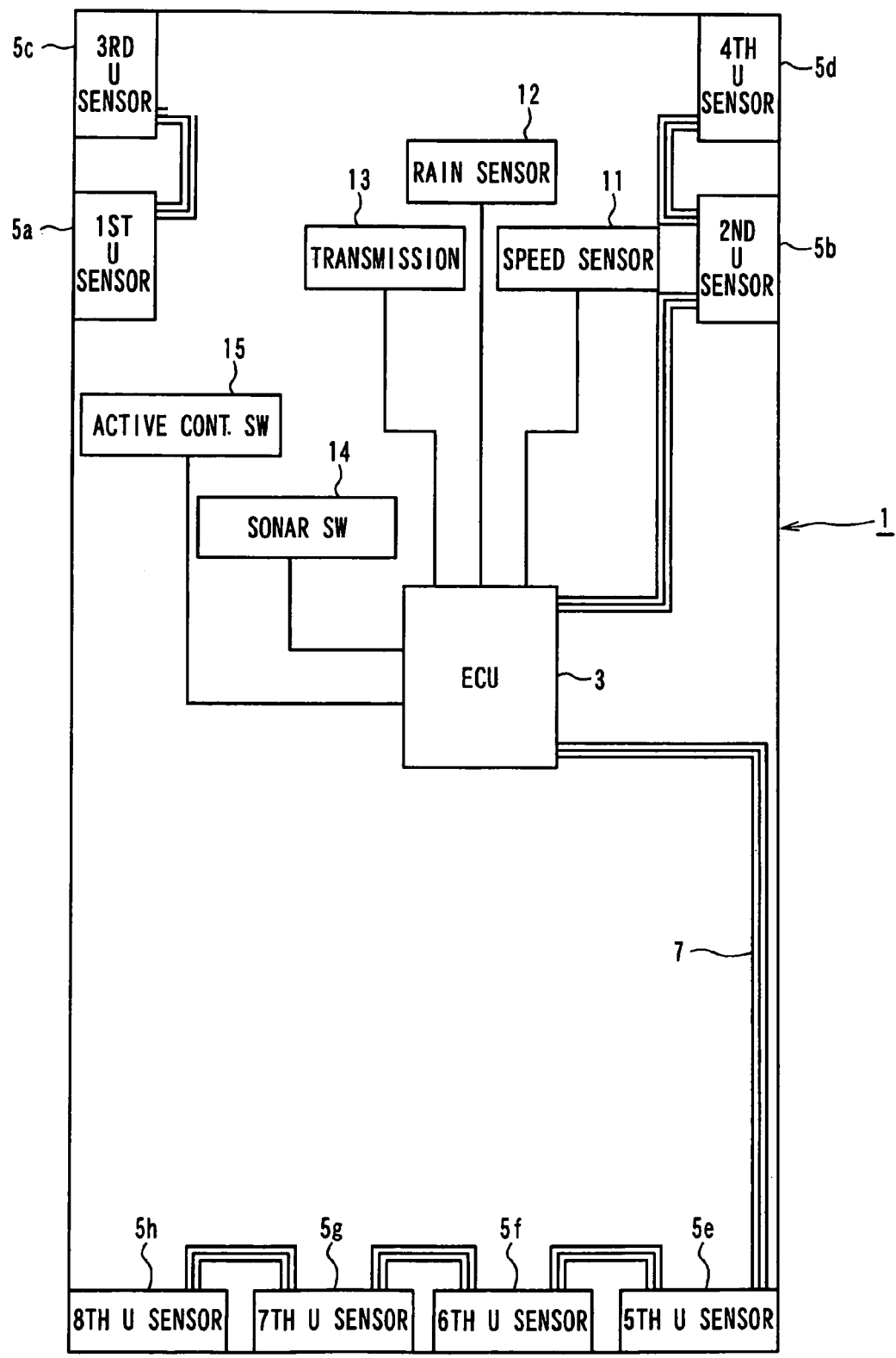
FIG. 1 is a block diagram showing an obstacle detection apparatus according to a first embodiment of the present invention.

An obstacle detection apparatus 1 according to a first embodiment of the present invention will be described with reference to FIG. 1.

The obstacle detection apparatus 1 includes an electronic control unit (ECU) 3, first to eighth ultrasonic sensors (U sensors) 5a-5h, and a serial communication line 7. The first to fourth ultrasonic sensors 5a-5d are disposed to a front part of a vehicle. The fifth to eighth ultrasonic sensors 5e-5h are disposed to a rear part of the vehicle. The obstacle detection apparatus 1 also includes a speed sensor 11, a rain sensor 12, a transmission device 13, a clearance sonar activation switch 14, and an active control setting switch 15. The ECU 3 receives signals from the speed sensor 11, the rain sensor 12, the transmission device 13, the clearance sonar activation switch 14, and the active control setting switch 15 directly or through another ECU (not shown).

First, a configuration of each of the ultrasonic sensors 5a-5h will be described.

Each of the ultrasonic sensors 5a-5h detects an obstacle by transmitting an ultrasonic wave toward a front or a rear of the vehicle and receiving a reflected wave reflected by the obstacle. Each of the ultrasonic sensors 5a-5d has a directivity and a detection distance that are variable. Each of the ultrasonic sensors 5a-5h may be a known ultrasonic sensor including a microphone 21 and a circuit part 22.

The microphone 21 transmits a transmission wave and receives a reception wave. The microphone 21 includes an oscillator (not shown) having an oscillation surface. The microphone 21 generates an ultrasonic wave as a transmission wave by ultrasonically oscillating the oscillation surface. The microphone 21 detects an ultrasonic wave as a reception wave based on that the oscillation surface oscillates when the microphone 21 receives the ultrasonic wave. The ultrasonic wave as the reception wave includes not only the ultrasonic wave transmitted from the microphone 21 and reflected by an obstacle but also an ultrasonic wave not transmitted from the microphone 21, that is, noise. In the present embodiment, the microphone 21 executes a noise monitoring process before transmitting the ultrasonic wave. In the noise monitoring, the microphone 21 only receives noise without transmitting an, ultrasonic wave. After the noise monitoring process, the microphone 21 transmits an ultrasonic wave and receives a reflected wave reflected by an obstacle.

Figure 2:
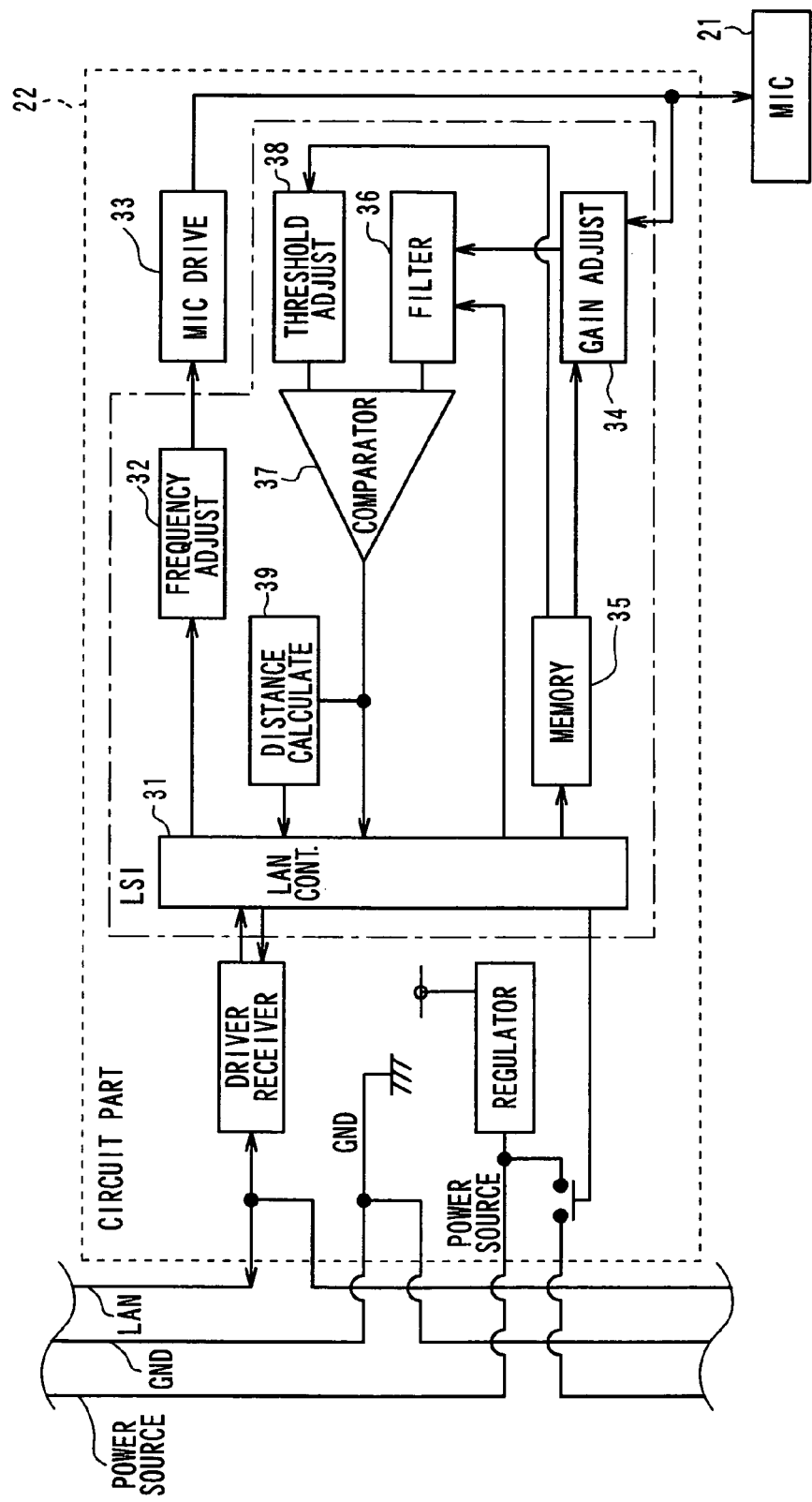
FIG. 2 is a block diagram showing an ultrasonic sensor in the obstacle detection apparatus.

As shown in FIG. 2, the circuit part 22 includes a local area network (LAN) control circuit 31, a frequency adjusting circuit 32, a microphone driving circuit 33, a gain adjusting circuit 34, a memory 35, a filter circuit 36, a comparator 37, a threshold adjusting circuit 38, and a distance calculating circuit 39. Among above circuits, the LAN control circuit 31, the frequency adjusting circuit 32, the gain adjusting circuit 34, the memory 35, the filter circuit 36, the comparator 37, the threshold adjusting circuit 38, and the distance calculating circuit 30 are integrally formed in a large-scale integrated circuit (LSI).

The ECU 3 outputs various communication frames. The LAN control circuit 31 receives the communication frames through the serial communication line 7. For example, the LAN control circuit 31 receives a mode-change command frame, a transmission-wave command frame, and a polling frame that requests the LAN control circuit 31 to transmit detected distance information and noise information. The LAN control circuit 31 transmits a polling frame to the ECU 3 for transmitting the detected distance information and the noise information. The ultrasonic sensor 5 includes a control circuit (not shown). The control circuit decodes the various communication frames.

The frequency adjusting circuit 32 outputs an ultrasonic-wave pulse signal to the microphone driving circuit 33. Then, the microphone driving circuit 33 drives the microphone 21, and the microphone 21 transmits an ultrasonic wave. The microphone driving circuit 33 drives the microphone 21 to transmit an ultrasonic wave based on a transmission-wave frequency and a transmission-wave intensity included in the mode-change command frame output from the ECU 3.

When the microphone 21 receives an ultrasonic wave, the microphone 21 outputs a reception signal to the gain adjusting circuit 34. The gain adjusting circuit 34 reads a gain stored in the memory and amplifies the reception signal by a predetermined factor. The gain adjusting circuit 34 outputs the amplified reception signal to the filter circuit 36. As described above, the ultrasonic wave received by the microphone 21 includes the reflected wave reflected by an obstacle and noise. Thus, in the present embodiment, the gain adjusting circuit 34 amplifies the noise received in the noise monitoring process and the reflected wave reflected by the obstacle after transmitting the ultrasonic wave.

The filter circuit 36 may be provided by a known switched capacitor filter (SCF) circuit. The filter circuit 36 filters the reception signal amplified by the gain adjusting circuit 34 and removes a signal component that has a frequency different from a resonance frequency of the microphone 21. Thus, the filter circuit 36 also removes an ultrasonic wave received from an outside of the directivity of each of the ultrasonic sensors 5a-5h. The filter circuit 36 sets a center frequency included in a frequency setting frame output from the ECU 3 to a center frequency of a filtering process.

The comparator 37 receives the reception signal treated with the filter process by the filter circuit 36. When the comparator 37 receives the reception signal indicating obstacle information, the comparator 37 compares a voltage level of the reception signal with a threshold value for an obstacle determination set by the threshold adjusting circuit 38. If the voltage level of the reception signal indicating the obstacle information is greater than the threshold value for the obstacle determination, the comparator 37 outputs the reception signal to the distance calculating circuit 39. When the comparator 37 receives the reception signal indicating noise information, the comparator 37 compares a voltage level of the reception signal with a threshold value for a noise determination set by the threshold adjusting circuit 38. If the voltage level of the reception signal indicating the noise information is greater than the threshold value for the noise determination, the comparator 37 outputs the reception signal to the LAN control circuit 31.

When the comparator 37 determines that the voltage level of the reception signal indicating the obstacle information is greater than the threshold value, the distance calculating circuit 39 calculates a distance to the obstacle base on a time from when the ultrasonic wave is transmitted till when the reflected wave is received. Then, the distance calculating circuit 39 outputs distance information indicating the calculated distance to the LAN control circuit 31.

As described above, the ECU 3 transmits the various communication frames to each of the ultrasonic sensors 5a-5h through the serial communication line 7. The communication frame includes the mode-change command signal, the transmission-wave command signal, and the polling frame. The mode-change command frame indicates an order to change the transmission-wave frequency and the transmission-wave intensity. The transmission-wave command frame indicates an order to transmit an ultrasonic wave. The polling frame includes an order to transmit the detected distance information and the noise information.

The mode-change command frame includes various fields such as a sensor ID, a message ID, the transmission-wave frequency, the filter center frequency, and an error check code (ECC).

In the field of the sensor ID, an ID assigned to each of the ultrasonic sensors 5a-5h is set. Each of the ultrasonic sensors 5a-5h refers the field of the sensor ID for determining whether information in the mode-change command frame is intended for itself.

In the field of the message ID, an ID assigned to each of the communication frames is set. Each of the ultrasonic sensors 5a-5h determines a kind of the communication frame by referring the field of the message ID.

In a case where the field of the message ID includes an ID corresponding to the mode-change command frame, the field following to the message ID includes the transmission-wave intensity and the transmission-wave frequency to be set in each of the ultrasonic sensors 5a-5h and the center frequency to be set in the filter process at the filter circuit 36. Each of the ultrasonic sensors 5a-5h determines the transmission-wave intensity, the transmission-wave frequency, and the center frequency by referring the field.

The transmission-wave intensity, the transmission-wave frequency, and the center frequency in the mode-change command frame are set in accordance with an operating mode selected from a first short distance mode, a second short distance mode, and a long distance, mode.

In the present embodiment, each of the ultrasonic sensors 5a-5h has two directivities and two detection distances.

Figure 3A:
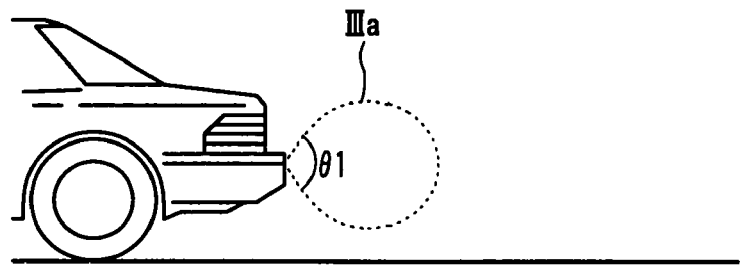
FIG. 3A is a diagram showing an exemplary detection area in a first short distance mode.

When the first short distance mode is set, each of the ultrasonic sensors 5a-5h has a detection area IIIA having a high directivity (i.e., wide directivity) and a short detection distance, for example, as shown in FIG. 3A. The detection area IIIA has an angle θ1. When the first short distance mode is set, each of the ultrasonic sensors 5a-5h can detect an obstacle in the vicinity of a road surface.

Figure 3B:
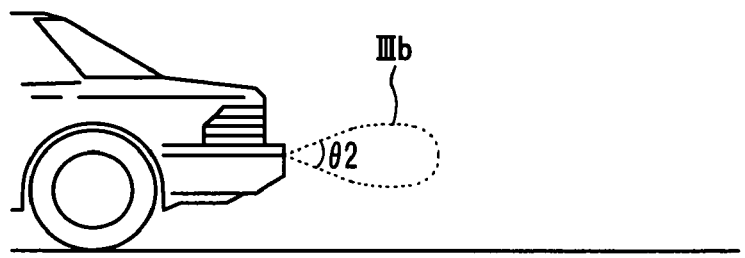
FIG. 3B is a diagram showing an exemplary detection area in a second short distance mode.

When the second short distance mode is set, each of the ultrasonic sensors 5a-5h has a detection area 111B having a low directivity (i.e., narrow directivity) and the short detection distance, for example, as shown in FIG. 3B. The detection area 111B has an angle θ2 smaller than the angle θ1. Thus, when the second short distance mode is set, a false detection in which each of the ultrasonic sensors 5a-5h detects noise as a reflected wave reflected by an obstacle by error is reduced compared with when the first short distance mode is set. Even if a raindrop adheres to the oscillation surface of the microphone 21 and an oscillation motion of the oscillation surface is reduced, since the directivity in the second short distance mode is lower than the directivity in the first short distance mode, the detection area 111B does not easily include a road surface.

Figure 3C:
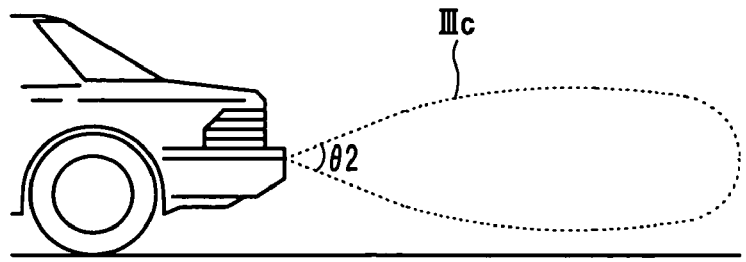
FIG. 3C is a diagram showing an exemplary detection area in a long distance mode.

When the long distance mode is set, each of the ultrasonic sensors 5a-5h has a detection area IIIC having the low directivity and a long detection distance, for example, as shown in FIG. 3C. The detection distance in the long distance mode is longer than the detection distance in the first and second short distance mode. Thus, when the long distance mode is set, each of the ultrasonic sensors 5a-5h can detect an obstacle further away from the vehicle compared with when the first or second short distance mode is set. Furthermore, since the detection area IIIC in the long distance mode has the low directivity, each of the ultrasonic sensors 5a-5h does not detect an obstacle in the vicinity of a road surface away from the vehicle. In the present embodiment, the detection area 111B in the second short distance mode and the detection area 111C in the long distance mode have the same directivity.

Each of the ultrasonic sensors 5a-5h is set to one of the first short distance mode, the second short distance mode, and the long distance mode so that each of the ultrasonic sensors 5a-5h can detect an obstacle depending on the situation. The detection distance of each of the ultrasonic sensors 5a-5h can be increased by increasing the transmission-wave intensity. The directivity of each of the ultrasonic sensors 5a-5h can be decreased by increasing the transmission-wave frequency. The transmission-wave frequency can be changed, for example, by driving the oscillator at different driving frequencies. The transmission-wave frequency can also be changed, by providing a plurality of oscillators that can transmit ultrasonic waves at different frequencies and selectively driving one of the oscillators.

An obstacle detecting operation of the obstacle detection apparatus 1 according to the present embodiment will be described with reference to FIG. 4 to FIG. 7. The ECU 3 executes a control process shown in FIG. 4 when the clearance sonar is activated. The control process starts after an ignition switch of the vehicle is turned on.

At S105, the ECU 3 determines whether the clearance sonar activation switch 14 is "ON." When the ECU 3 determines that the clearance sonar activation switch 14 is "ON," which corresponds to "YES" at S105, the process proceeds to S110. When the ECU 3 determines that the clearance sonar activation switch 14 is not "ON," which corresponds to "NO" at S105, the process at S105 is repeated until the clearance sonar activation switch 14 is turned on. The clearance sonar activation switch 14 can be turned on and off by a user. When a user wants to activate a clearance sonar, the user turned on the clearance sonar activation switch 14.

At S110, the ECU 3 determines whether a shift range of the transmission device 13 is in "P" (i.e., a parking range) based on shift range information of the transmission device 13 transmitted from a shift sensor. When the ECU 3 determines that the shift range is in "P," which corresponds to "YES" at S110, the process returns to S105, and the processes from S105 to S110 are repeated until the shift range becomes other than "P." When the ECU determines that the shift range is not in "P," the process proceeds to S115 and the ECU 3 selects one or more ultrasonic sensors 5a-5h corresponding to the shift range. A sensor selecting process executed at S115 will be described with reference to FIG. 5.

At S205, the ECU 3 determines whether the shift range is in "R" (i.e., a reverse range) based on the shift range information of the transmission device 13 transmitted from the shift sensor. When the ECU 3 determines that the shift range is in "R," which corresponds to "YES" at S205, the process proceeds to S210. When the ECU 3 determines that the shift range is not in "R," which corresponds to "NO" at S205, the process proceeds to S215. At S210 and S215, the ECU 3 sets one or more ultrasonic sensors to be controlled. The ECU 3 sets a variable "n" to the maximum number of the ultrasonic sensors to be controlled. For example, when the ECU 3 sets the variable "n" to "8," the ECU 3 selects the first to eighth ultrasonic sensors 5a-5h as controlled objects.

At S210, the vehicle moves backward. Thus, the ECU 3 sets the variable "n" to "8" for selecting all the ultrasonic sensors 5a-5h as the controlled objects. At S215, the vehicle moves forward. In the present case, the ECU 3 does not need to control the fifth to eighth ultrasonic sensors 5e-5h disposed to the rear part of the vehicle. Thus, the ECU 3 sets the variable "n" to "4" for selecting the first to fourth ultrasonic sensors 5a-5d disposed to the front part of the vehicle as the controlled objects. In the process at S210 or S215, the variable "n" is set to the maximum number of the ultrasonic sensors to be controlled. The following processes, the selected ultrasonic sensors are treated as the controlled objects. When the process at S210 or S215 ends, the sensor selecting process ends, and the process proceeds to S120 in FIG. 4.

At S120, the ECU 3 transmits a first short-distance mode setting command signal to each of the selected ultrasonic sensors, and thereby each of the selected ultrasonic sensors is set to the first short distance mode.

Because an obstacle may already be present in the immediate vicinity of the vehicle at a time when the clearance sonar begins to activate, the first short distance mode is set first so that the obstacle can be detected with certainty. An obstacle may also be present at a position away from the vehicle at the time when the clearance sonar begins to activate. However, the possibility to come in contact with the obstacle away from the vehicle is lower than the possibility to come in contact with the obstacle in the immediate vicinity of the vehicle. Thus, the safety can be increased by detecting the obstacle in the vicinity of the vehicle first, and then changing the operating mode to the long distance mode.

Figure 6:
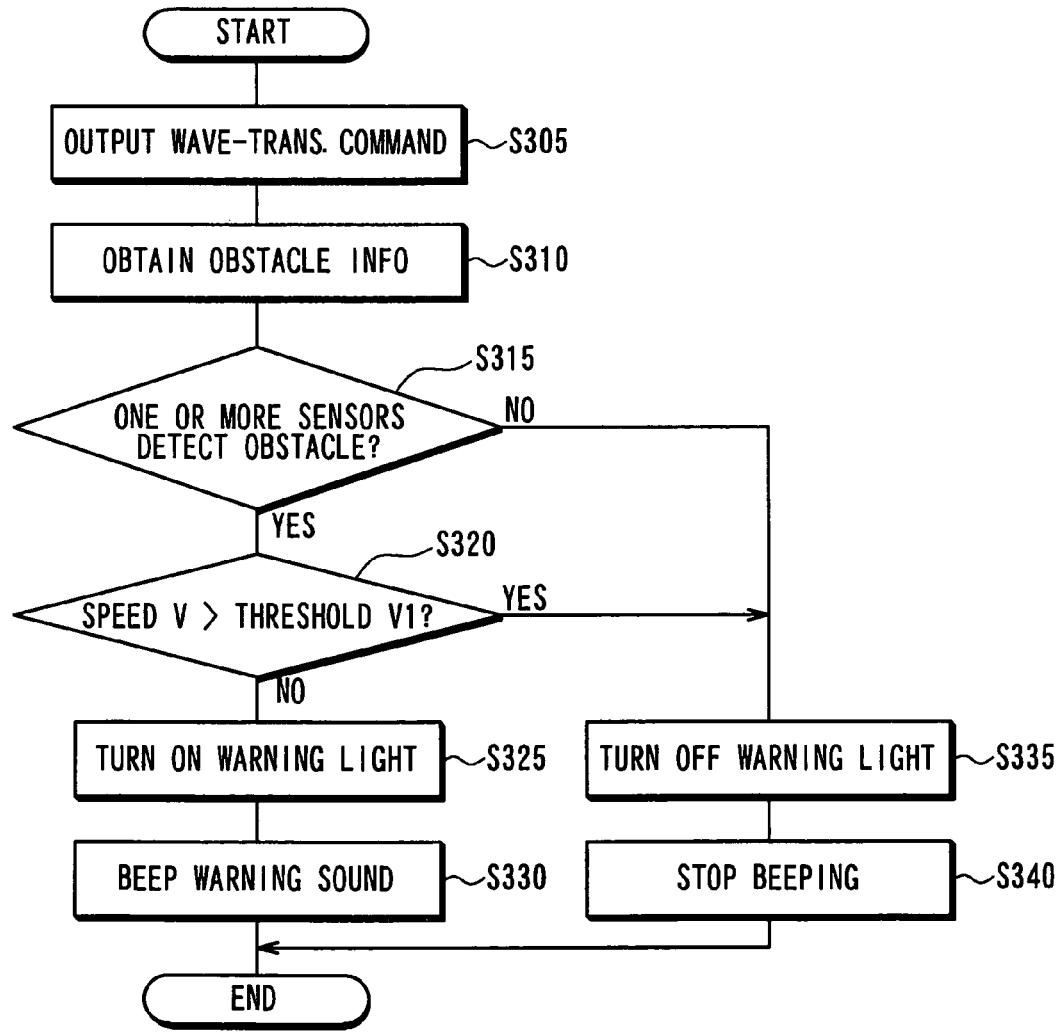
FIG. 6 is a flowchart showing an obstacle detecting process.

At S125, the ECU 3 executes an obstacle detecting process as shown in FIG. 6.

At S305, the ECU 3 outputs an ultrasonic-wave transmission command signal to the selected ultrasonic sensors. Then, each of the selected ultrasonic sensors monitors noise, transmits an ultrasonic wave, and receives a reflected wave. The ECU 3 also order to each of the selected ultrasonic sensors to detect a presence of noise and a distance to an obstacle based on results of the noise monitoring, the transmission of the ultrasonic wave, and the reception of the reflected wave.

At S310, the ECU 3 receives the noise information and the obstacle information from each of the selected ultrasonic sensors and the process proceeds to S315. During the process at S310, the ECU 3 outputs an obstacle information request signal to each of the selected ultrasonic sensors. Then, each of the selected ultrasonic sensors outputs the noise information and the obstacle information to the ECU 3. The obstacle information includes a presence or non-presence of an obstacle and a distance to the obstacle.

At S315, the ECU 3 determines whether one or more of the selected ultrasonic sensors detect an obstacle based on the obstacle information received from the selected ultrasonic sensors. When the ECU 3 determines that one or more of the selected ultrasonic sensors detect an obstacle, which corresponds to "YES" at S315, the process proceeds to S320. When the ECU 3 determines that none of the selected ultrasonic sensors detect an obstacle, which corresponds to "NO" at S315, the process proceeds to S335.

At S320, the ECU 3 outputs a vehicle-speed information request signal to the speed sensor 11. Then, the speed sensor outputs vehicle-speed information to the ECU 3. The ECU 3 determines whether a current vehicle speed V is greater than a predetermined speed (threshold) V1 based on the vehicle-speed information. When the ECU 3 determines that the current vehicle speed V is less than or equal to the predetermined speed V1, which corresponds to "NO" at S320, the process proceeds to S325. At S325, the ECU 3 turns on warning lights corresponding to the ultrasonic sensors that detect the obstacle. At S330, the ECU 3 controls a warning device to beep with a warning sound corresponding to the distance to the obstacle. When the ECU 3 determines that the current vehicle speed V is greater than the predetermined speed V1, which corresponds to "YES" at S320, the process proceeds to S335.

At S335, the ECU 3 turns off the warning lights. At S340, the ECU 3 controls the warning device to stop beeping. The processes at S335 and S340 are performed because it can be assumed that a user does not require a warning by the clearance sonar when the vehicle runs at a speed greater than the predetermined speed V1.

Figure 4:
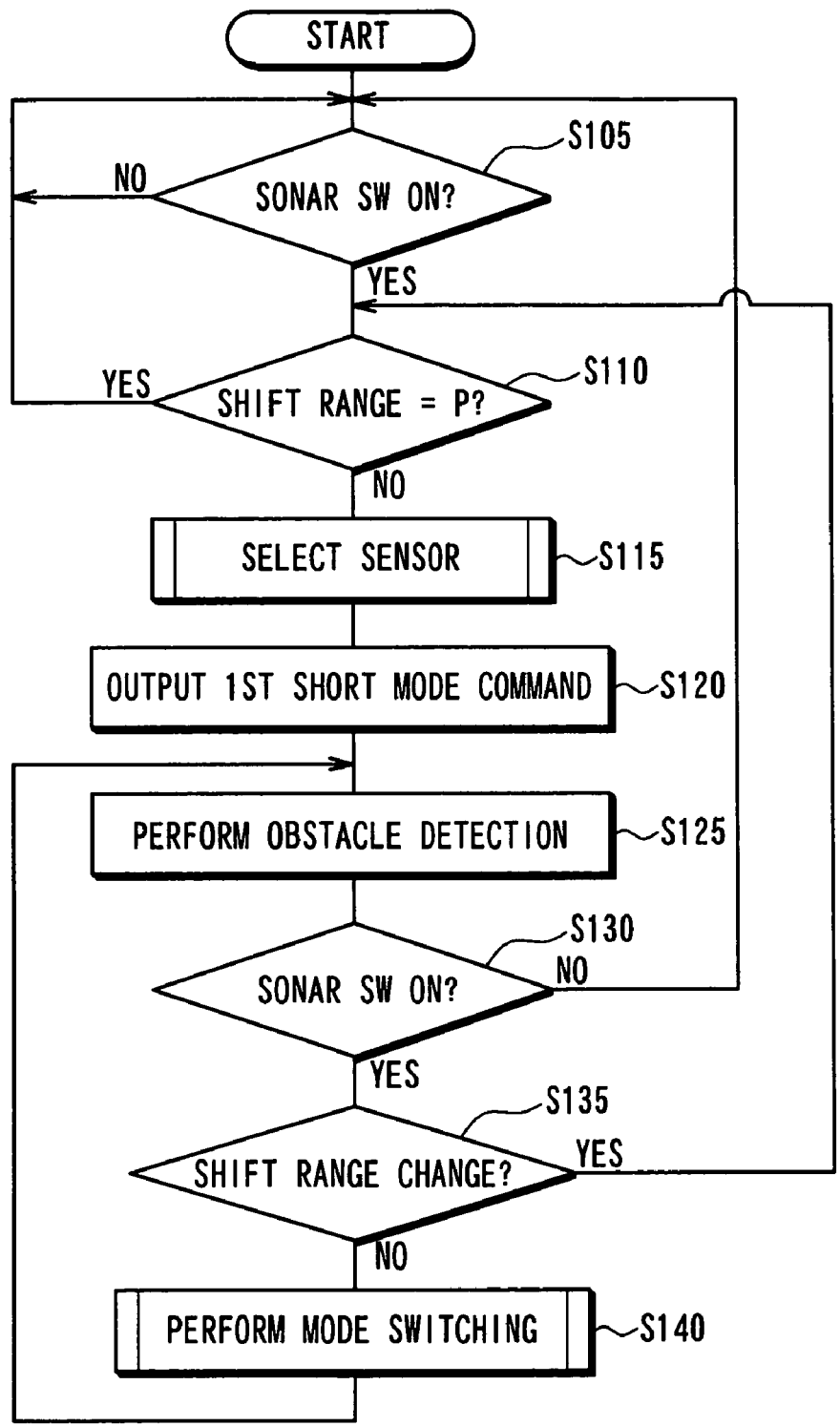
FIG. 4 is a flowchart showing a control process executed by an ECU in the obstacle detection apparatus when a clearance sonar is activated.
Figure 5:
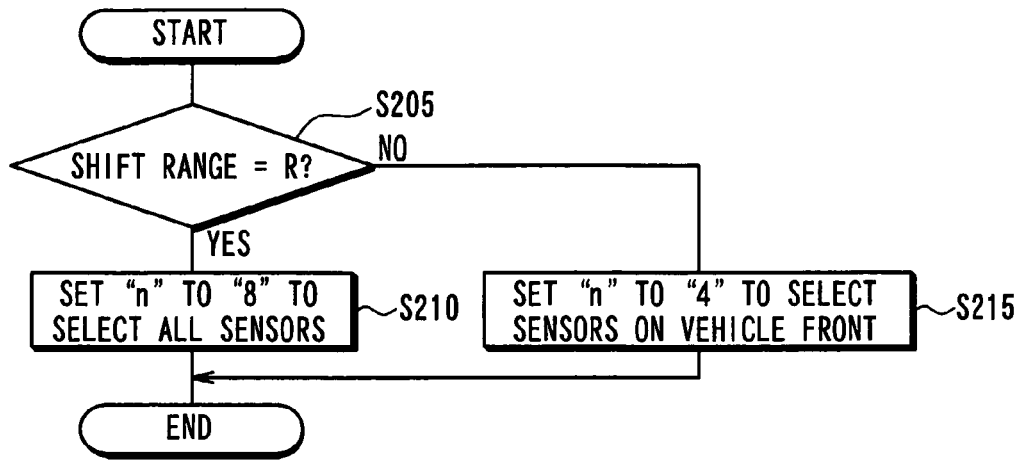
FIG. 5 is a flowchart showing a sensor selecting process.

When the obstacle detection process shown in FIG. 6 ends, the process proceeds to S130 in FIG. 4. At S130, the ECU 3 determines whether the clearance sonar activation switch 14 is "ON." When the ECU 3 determines that the clearance sonar activation switch 14 is "ON," which corresponds to "YES" at S130, the process proceeds to S135. When the ECU 3 determines that the clearance sonar activation switch 14 is not "ON," the ECU 3 determines that a user turns off the clearance sonar activation switch 14, and the process returns to S105. Then, the ECU 3 waits until the clearance sonar activation switch 14 is turned on again.

At S135, ECU 3 determines whether the shift range of the transmission device 13 is changed. The ECU 3 distinguishes the shift range among "P," "R," and the others. The others include "N" (i.e., a neutral range), "D" (i.e., a driving range), and "B" (i.e., an engine brake range). The ECU 3 determines whether the shift range is changed from one of "P," "R," and the others to another one. When the ECU 3 determines that the shift range is changed, which corresponds to "YES" at S135, the process returns to S110 for changing the controlled objects. When the ECU 3 determines that the shift range is not changed, which corresponds to "NO" at S135, the process proceeds to S140, and the sensor operating-mode changing process is executed.

During the sensor operating-mode changing process, the operating mode of each of the selected ultrasonic sensors is set to one of the first short distance mode, the second short distance mode, and the long distance mode in accordance with the vehicle speed, a rainfall amount, and a presence of noise. The sensor operating-mode changing process will be described with reference to FIG. 7.

At S405, the ECU 3 determines whether an active control setting is changed. When the ECU 3 determines that the active control setting is changed, which corresponds to "YES" at S405, the process proceeds to S410. When the ECU 3 determines that the active control setting is not changed, which corresponds to "NO" at S405, the process proceeds to S445. The active control setting is a setting whether the operating mode is automatically changed. The active control setting can be changed by a user by operating the active control setting switch 15.

At S410, the ECU 3 determines whether the active control is ON. When the ECU 3 determines that the active control setting is not changed, there are two cases, that is, a case where the active control remains ON and a case where the active control remains OFF. Thus, the ECU 3 determines whether the active control is ON.

When the ECU 3 determines that the active control setting is not ON, which corresponds to "NO" at S410, the ECU 3 determines that the active control remains OFF. Thus, the selected ultrasonic sensors keep the first short distance mode set at S120, and the ECU 3 ends the sensor operating-mode changing process. When the ECU determines that the active control setting is ON, which corresponds to "YES" at S410, the process proceeds to S415.

At S415, the ECU 3 outputs the vehicle-speed information request signal to the speed sensor 11, and the speed sensor 11 outputs the vehicle speed information to the ECU 3. The ECU 3 determines whether a current vehicle speed V is greater than a predetermined speed (threshold) V2 based on the vehicle-speed information. In a case where the vehicle speed V is greater than the predetermined speed V2, it is preferred to set the select ultrasonic sensors to detect an obstacle away from the vehicle. In a case where the vehicle speed V is less than or equal to the predetermined speed V2, it is preferred to set the select ultrasonic sensors to detect an obstacle in the vicinity of the vehicle rather than an obstacle away from the vehicle. Thus, when the ECU determines that the current vehicle speed V is greater than the predetermined speed V2, which corresponds to "YES" at S415, the process proceeds to S420, and the ECU 3 outputs a long-distance mode setting command signal to each of the selected ultrasonic sensors. Thereby, in a case where the vehicle speed V is greater than the predetermined speed V2, each of the selected ultrasonic sensors can have properties for detecting an obstacle away from the vehicle. When the ECU determines that the current vehicle speed V is greater than the predetermined speed V2, which corresponds to "NO" at S415, the process proceeds to S425. During the process at S415, the ECU 3 may also compare the vehicle speed V and the predetermined speed V2 based on the vehicle-speed information obtained at S320. The ECU 3 may include a vehicle speed determining portion, and the vehicle speed determining portion may execute the process at S415.

At S425, the ECU 3 outputs a rainfall information request signal to the rain sensor 12. The rain sensor 12 outputs rainfall information to the ECU 3. The ECU determines whether a rainfall amount Ra is greater than a predetermined about (threshold) D based on the rainfall information. In a case where the vehicle speed V is less than or equal to the predetermined speed V2, it is preferred to set the selected ultrasonic sensors to the first short distance mode so that the selected ultrasonic sensors can detect an obstacle in the vicinity, of a road surface. However, in a case where the rainfall amount is large, a raindrop may adhere to the oscillation surface, and the directivity may be increased from a predetermined directivity. Thus, if the selected ultrasonic sensors are set to the first short distance mode, the detection areas may include the road surface. Therefore, at S425, the ECU 3 determines whether the second short distance mode having the low directivity should be set by comparing the rainfall amount Ra with the predetermined amount D. When the ECU 3 determines that the rainfall amount Ra is less than or equal to the predetermined amount D, which corresponds to "NO" at S425, the process proceeds to S430. When the ECU 3 determines that the rainfall amount Ra is greater than the predetermined amount D, which corresponds to "YES" at S425, the process proceeds to S430. The ECU 3 may include a rainfall amount determining portion, and the rainfall amount determining portion may execute the process at S425.

At S430, the ECU 3 determines whether noise is present. Even in a case where the ECU 3 determines that the rainfall amount Ra is less than or equal to the predetermined amount D, when noise is present, the selected ultrasonic sensors are liable to detect the noise as a reflected wave from an obstacle by error if the selected ultrasonic sensors are set to the first short distance mode in which the directivity is higher than the directivity in the second short distance mode. Therefore, at S430, the ECU 3 determines which mode should be set, the first short distance mode or the second short distance mode, by determining a presence of noise. When the ECU 3 determines that noise is not present, which corresponds to "NO" at S430, the process proceeds to S435. At S435, the ECU 3 outputs a first short-distance mode setting command signal to each of the selected ultrasonic sensors. Thus, when the vehicle speed V is less than or equal to the predetermined speed V2, the rainfall amount Ra is less than or equal to the predetermined amount D, and noise is not present, each of the selected ultrasonic sensors is set to the first short distance mode, and each of the selected ultrasonic sensors can detect an obstacle in the vicinity of a road surface. When the ECU 3 determines that noise is present, which corresponds to "YES" at S430, the process proceeds to S440. The ECU 3 determines a presence of noise based on the noise information received from each of the selected ultrasonic sensors at S310. The ECU 3 may include a noise determining portion, and the noise determining portion may execute the process at S430.

At S440, the ECU 3 outputs a second short-distance mode setting command signal to each of the selected ultrasonic sensors. Thus, when the rainfall amount Ra is greater than the predetermined amount D or when noise is present, each of the selected ultrasonic sensors is set to the second short distance mode, and each of the selected ultrasonic sensors has the low directivity. When the second short distance mode is set, even if the oscillation motion of the oscillation surface is reduced due to a raindrop, and thereby the directivity is increased, the detection area does not easily include a road surface. Furthermore, a false detection in which each of the ultrasonic sensors detect noise as a reflected wave from an obstacle by error can be reduced.

When the ECU 3 determines that the active control setting is changed at S405, that is, when a user operates the active control setting switch 15 and changes the active control setting, the process proceeds to S445.

At S445, the ECU 3 determines whether the active control setting is changed from OFF to ON or from ON to OFF. When the ECU 3 determines that the active control setting is OFF, which corresponds to "NO" at S445, the process proceeds to S435. At S435, the ECU 3 outputs the first short-distance mode setting command signal to each of the selected ultrasonic sensors.

When he ECU 3 determines that the active control setting is ON, which corresponds to "YES" at S445, the process proceeds to S415.

Figure 7:
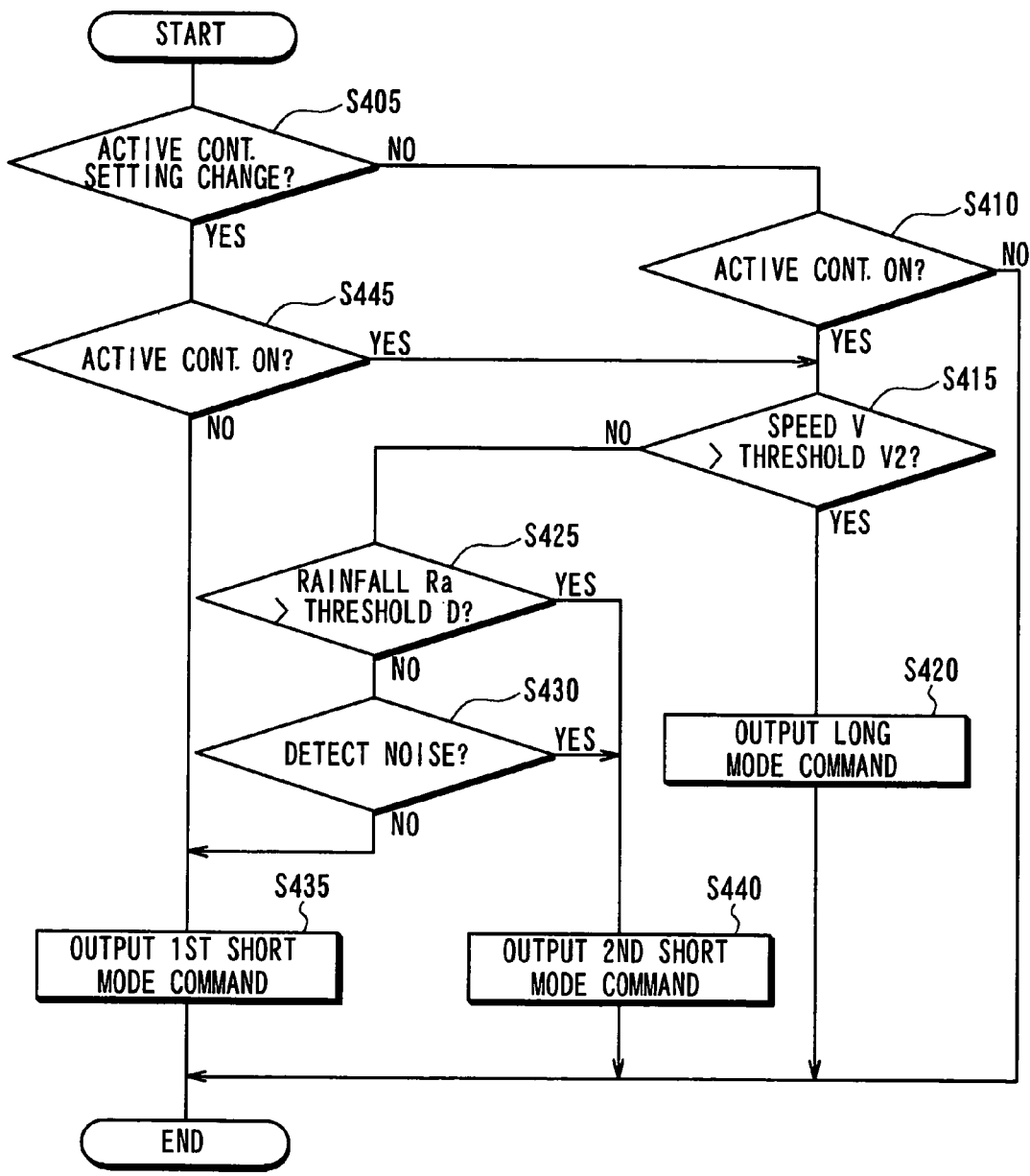
FIG. 7 is a flowchart showing a sensor operating-mode changing process.

When the processes from S405 to S445 end, the sensor operating-mode changing process shown in FIG. 7 ends. Then, the process returns to S125 in FIG. 4. The ECU 3 repeatedly executes the processes from S125 to S140 unless the clearance sonar activation switch 14 is turned off or the shift range is changed.

As described above, in the obstacle detection apparatus 1 according to the present embodiment, the directivity is changed in accordance with not only the vehicle speed but also the rainfall amount and a presence of noise. When the rainfall amount Ra is greater than the predetermined amount D, the second short-distance mode in which the directivity is lower than the directivity in the first short distance mode is set. Thus, even if a raindrop adheres to the oscillation surface, and thereby the oscillation motion of the oscillation surface is reduced and the directivity is increased, the detection area does not easily include a road surface compared with a case where the first short distance mode is set. Therefore, a false detection in which a reflected wave from a road surface is detected as a reflected wave from an obstacle by error can be reduced.

When noise is present, the second short-distance mode in which the directivity is lower than the directivity in the first short distance mode is set. Thus, a false detection in which noise is detected as a reflected wave from an obstacle by error can be reduced.

Second Embodiment

An obstacle detection apparatus 1 according to a second embodiment of the present invention will now be described. The obstacle detection apparatus 1 according to the present embodiment includes a parking assist system. The ECU 3 receives a signal from a parking assist system activation switch. The other parts of the obstacle detection apparatus 1 according to the present embodiment may be similar to those of the obstacle detection apparatus 1 according to the first embodiment. Therefore, different parts will be mainly described below.

Detection areas of the ultrasonic sensors 5a-5h using the parking assist system will be described with reference to FIGS. 8A and 8B.

Figure 8A:
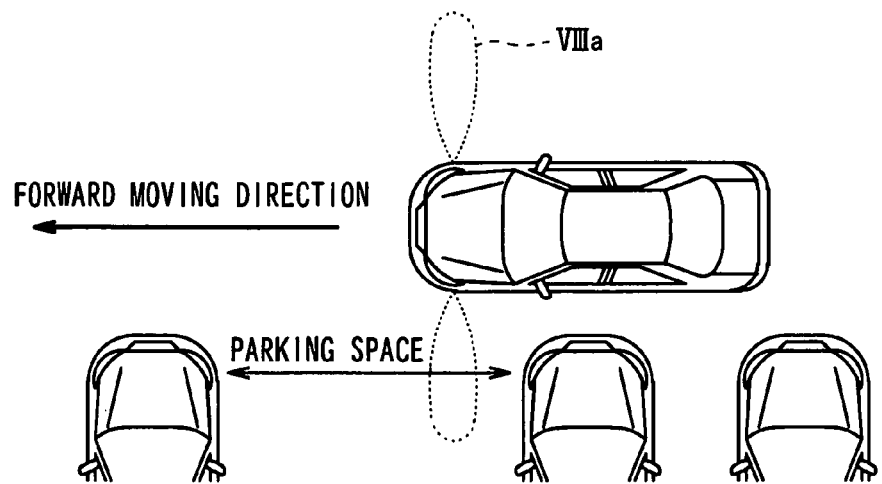
FIG. 8A and FIG. 8B are diagrams showing detection areas of an obstacle detection apparatus according to a second embodiment when a parking assist system is activated.
Figure 8B:
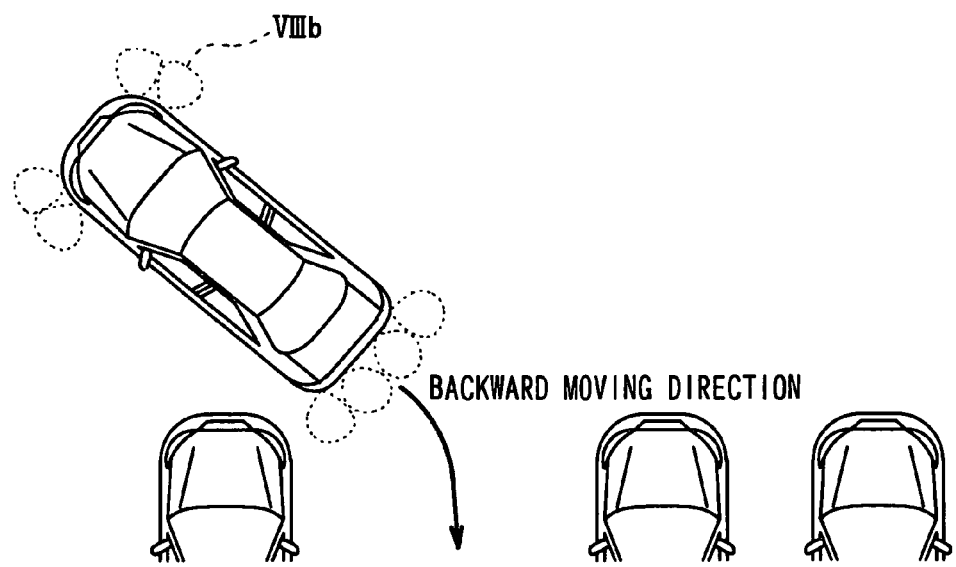

In a case where the parking assist system is used, the parking assist system searches a parking space located at a side of the vehicle while the vehicle moves forward as shown in FIG. 8A. Then, when a user operates the parking assist system so that the vehicle goes into the parking space, the vehicle moves backward into the parking space as shown in FIG. 8B. The parking assist system operating in the above-described way has already been put into practical use. Therefore, a detail configuration of the parking assist system will not be described in the present specification.

When the vehicle moves forward, the parking assist system is required to recognize parked vehicles that are away from the vehicle for searching a parking space. Therefore, it is preferred that the long distance mode is set as shown by areas VIIIa in FIG. 8A.

When the vehicle moves backward, an obstacle may come close to the vehicle as the vehicle goes into the parking space. Thus, it is preferred that the first short distance mode is set as shown by areas. VIIIb in FIG. 8B. However, even when the vehicle moves backward, if it is raining or noise is present, it is preferred that the second short distance mode is set so that a false detection in which a reflected wave from a road surface or noise is detected as a reflected wave from an obstacle by error can be reduced.

In control processes relative to the parking assist system, a part relative to an obstacle detecting operation will be described with reference to FIG. 9 to FIG. 11. When the parking assist system is activated, the ECU 3 executes a control process shown in FIG. 9.

At S505, the ECU 3 determines whether the parking assist system activation switch is ON. When the ECU 3 determines that the parking assist system activation switch is ON, which corresponds to "YES" at S505, the process proceeds to S510. When the ECU 3 determines that the parking assist system activation switch is not ON, which corresponds to "NO" at S505, the ECU 3 repeats the process at S505 until the parking assist system activation switch is turned on. The parking assist system activation switch can be turned on and off by a user. When a user wants to activate the parking assist system, the user turned on the parking, assist system activation switch.

At S510, the ECU 3 determines whether the shift range of the transmission device 13 is in "P" based on the shift range information received from the shift sensor in a manner similar to S110. When the ECU 3 determines that the shift range is in "P," which corresponds to "YES" at S510, the process returns to S505. Thus, the ECU 3 repeats the processes from S505 to S510 until the parking assist system activation switch is ON and the shift range becomes other than "P." When the ECU 3 determines that the shift range is not in "P," which corresponds to "NO" at S510, the process proceeds to S515. At S510, the ECU 3 executes a sensor selecting process and a sensor operating-mode setting process as shown in FIG. 10.

At S605, the ECU 3 determines whether the shift range of the transmission device 13 is in "R" based on the shift range information received from the shift sensor in a manner similar to S110. When the ECU 3 determines that the shift range is in "R," which corresponds to "YES" at S605, the process proceeds to S610. At S610, the ECU 3 sets the variable "n" to "8" for selecting all the ultrasonic sensors 5a-5h, and the process proceeds to S615. At S615, the ECU 3 outputs the first short-distance mode command signal to all the ultrasonic sensors 5a-5h, and thereby all the ultrasonic sensors 5a-5h are set to the first short distance mode. Then, the sensor selecting process and the sensor operating-mode setting process shown in. FIG. 10 ends.

When the ECU 3 determines that the shift range is not in "R," which corresponds to "NO" at S605, the process proceeds to S620. At S620, the ECU 3 sets the variable "n" to "2" for selecting the first ultrasonic sensor 5a and the second ultrasonic sensor 5b for detecting a parking space, and the process proceeds to S625. At S625, the ECU 3 outputs the long-distance mode setting command signal to the first ultrasonic sensor 5a and the second ultrasonic sensor 5b so that the first ultrasonic sensor 5a and the second ultrasonic sensor 5b are set to the long distance mode. Then, the sensor selecting process and the sensor operating-mode setting process shown in FIG. 10 ends.

Figure 10:
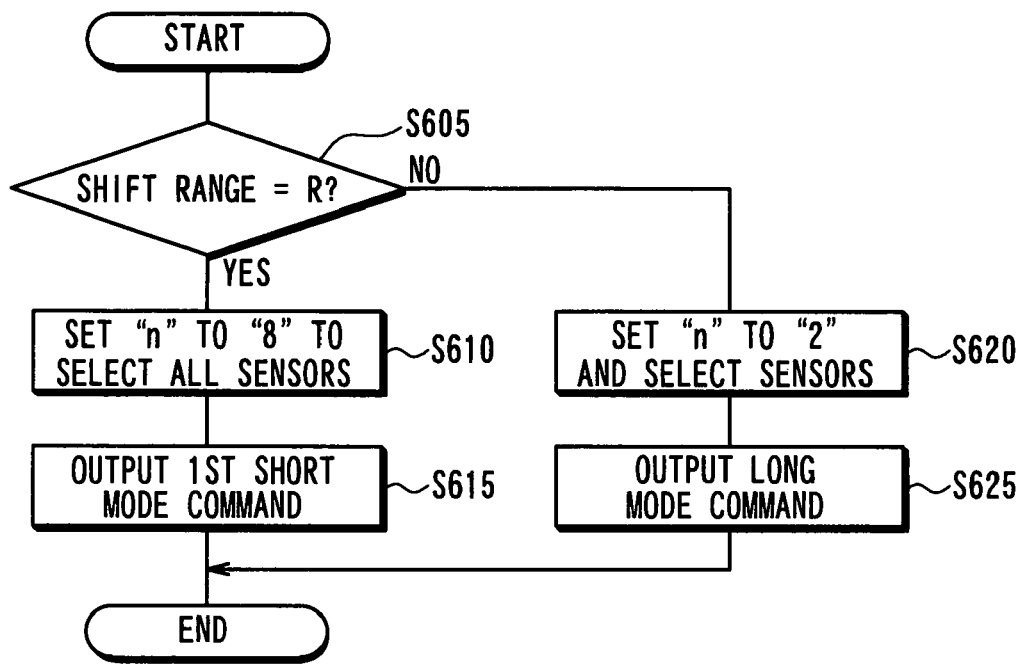
FIG. 10 is a flowchart showing a sensor selecting process and a mode setting process corresponding to a shift rage.

When the sensor selecting process and the sensor operating-mode setting process shown in FIG. 10 ends, the process proceeds to S520. At S520, the ECU 3 executes an obstacle detecting process (i.e., a parking space detecting process). The obstacle detecting process performed at S520 is similar to the processes from S305 to S340. The ECU 3 commands that each of the selected ultrasonic sensors monitors noise, transmits an ultrasonic wave, and receives a reflected wave. The ECU 3 also commands that each of the selected ultrasonic sensors detects a presence of noise and a distance to an obstacle based on results of the noise monitoring, the transmission of the ultrasonic wave, and the reception of the reflected wave.

Then, based on the obstacle information obtained at S310, a parking space is searched or an obstacle is detected. A method of searching a parking space and a method of controlling the vehicle to go into the parking space are known. Therefore, a description about the parking assist system will be omitted.

After the process at S520 ends, the process proceeds to S525. At S525, the ECU 3 determines whether the parking assist system activation switch is ON. When the ECU 3 determines that the parking assist system activation switch is not ON, which corresponds to "NO" at S525, the ECU 3 determines that a user turns off the parking assist system activation switch. Thus, the process returns to S505, and the ECU 3 waits until the parking assist system is turned on.

When the ECU 3 determines that the parking assist system activation switch is ON, which corresponds to "YES" at S525, the process proceeds to S530. At S530, the ECU 3 determines whether the shift range of the transmission device 13 is in "P" based on the shift range information received from the shift sensor in a manner similar to S110. The ECU 3 distinguishes the shift range among "P," "R," and the others. The others include "N" (i.e., a neutral range), "D" (i.e., a driving range), and "B" (i.e., an engine brake range). The ECU 3 determines whether the shift range is changed from one of "P," "R," and the others to another one. When the ECU 3 determines that the shift range is changed, which corresponds to "YES" at S530, the process returns to S510 for changing the controlled objects and the operating mode. When the ECU 3 determines that the shift range is not changed, which corresponds to "NO" at S530, the process returns to S535, and the ECU 3 executes a sensor operating-mode changing process.

Figure 11:
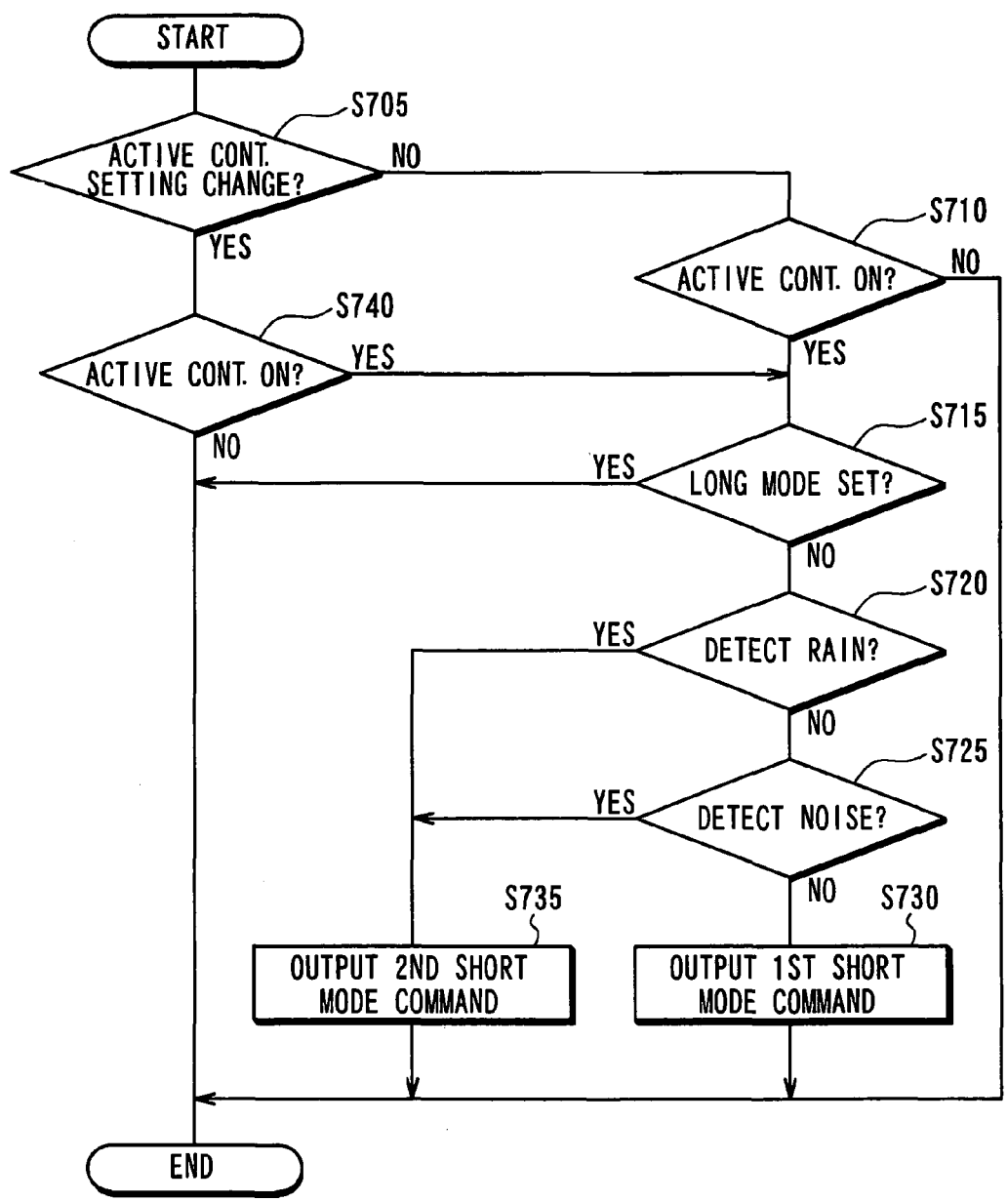
FIG. 11 is a flowchart showing a sensor operating-mode changing process.
Figure 12A:
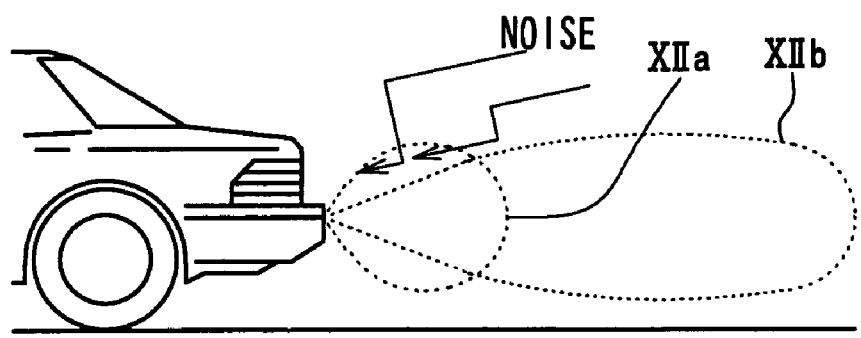
FIG. 12A and FIG. 12B are diagrams showing detection areas of an obstacle detection apparatus according to the prior art.
Figure 12B:
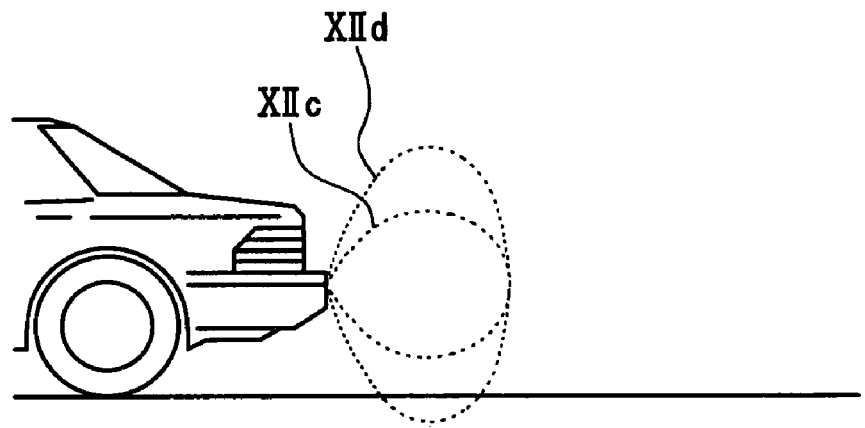

During the process at S535, the operating mode of the selected ultrasonic sensors is set to one of the first short distance mode and the second short distance mode based on the rainfall amount and a presence of noise as shown in FIG. 11.

At S705, the ECU 3 determines whether the active control setting is changed in a manner similar to S405. When the ECU 3 determines that the active control setting is not changed, which corresponds to "NO" at S705, the process proceeds to S710. When the ECU 3 determines that the active control setting is changed, which corresponds to "YES" at S705, the process proceeds to S740.

At S740, the ECU 3 determines whether the active control is ON. In a case where the active control is not ON, the active control remains OFF. Thus, each of the selected ultrasonic sensors keep the first short distance mode set at S615 or the long distance mode set at S625. Thus, when the ECU 3 determines that the active control is not ON, which corresponds to "NO" at S740, the ECU 3 ends the sensor operating-Mode changing process shown in FIG. 11. When the ECU 3 determines that the active control is not ON, which corresponds to. "NO" at S740, the process proceeds to S715.

At S715, the ECU 3 determines whether each of the selected ultrasonic sensors is set to the long distance mode. In a case where each of the selected ultrasonic sensors is set to the long distance mode, the directivity of each of the ultrasonic sensors is lower than the directivity in the first short distance mode. Thus, even if the oscillation motion of the oscillation surface is reduced due to a raindrop adhering to the oscillation surface, and thereby the directivity is increased, the detection area does not easily include a road surface. In addition, a false detection in which noise is detected as a reflected wave from an obstacle by error can be reduced. Therefore, when the ECU 3 determines that each of the selected ultrasonic sensors is set to the long distance mode, which corresponds to "YES" at S715, the ECU 3 ends the sensor operating-mode changing process shown in FIG. 11, and each of the selected ultrasonic sensors keeps the long distance mode. When the ECU 3 determines that each of the selected ultrasonic sensors is not set to the long distance mode, which corresponds to "NO" at S715, the process proceeds to S720. The ECU 3 can determine whether each of the selected ultrasonic sensors is set to the long distance mode by determining whether the shift range is in "R" based on the shift range information received from the shift sensor in a manner similar to S110. This is because the ECU 3 outputs the long-distance mode setting command signal to each of the selected ultrasonic waves when the shift range is not in "R" at S625.

At S720, the ECU 3 outputs the rainfall information request signal to the rain sensor 12 in a manner similar to S425, and determines whether the current rainfall amount Ra is greater than the predetermined amount D based on the rainfall information received from the rain sensor 12. In a case where each of the ultrasonic sensors is not in the long distance mode at S715, it is preferred that each of the selected ultrasonic sensors is set to the first short distance mode so that each of the selected ultrasonic sensor has the high directivity appropriate for detecting an obstacle in the vicinity of a road surface. However, when the rainfall amount is large, a raindrop may adhere to the oscillation surface, and the directivity may be increased from the predetermined directivity. Thus, if each of the selected ultrasonic sensors is set to the first short distance mode when it is raining, the detection area may include a road surface. Thus, the ECU 3 determines whether the second short distance mode should be set by comparing the rainfall amount Ra with the predetermined amount D. When the ECU 3 determines that the rainfall amount Ra is less than or equal to the predetermined amount D, which corresponds to "NO" at S720, the process proceeds to S725.

When the ECU 3 determines that the rainfall amount Ra is greater than the predetermined amount D, which corresponds to "YES" at S720, the process proceeds to S735. The ECU 3 may include a rainfall amount determining portion, and the rainfall amount determining portion may execute the process at S720.

At S725, the ECU 3 determines whether noise is present in a manner similar to S430. Even in a case where the ECU 3 determines that the rainfall amount Ra is less than or equal to the predetermined amount D at S720, when noise is present, the selected ultrasonic sensors are liable to detect the noise as a reflected wave from an obstacle by error if the selected ultrasonic sensors are set to the first short distance mode in which the directivity is higher than the directivity in the second short distance mode. Therefore, at S725, the ECU 3 determines which mode should be set, the first short distance mode or the second short distance mode, by determining a presence of noise. When the ECU 3 determines that noise is not present, which corresponds to "NO" at S725, the process proceeds to S730, and the ECU 3 outputs the first short-distance mode setting command signal to each of the selected ultrasonic sensors. Thus, when the rainfall amount Ra is less than or equal to the predetermined amount D and noise is not present, each of the selected ultrasonic sensors is set to the first short distance mode appropriate for detecting an obstacle in the vicinity of a road surface. When the ECU 3 determines that noise is present, which corresponds to "YES" at S725, the process proceeds to S735. The ECU 3 can determine the presence of noise based on the noise information received from each of the selected ultrasonic sensors at S310 in the obstacle detecting process in S520. The ECU 3 may include a noise determining portion, and the noise determining portion may execute the process at S725.

At S735, the ECU 3 outputs the second short-distance mode setting command signal to each of the selected ultrasonic sensors. Thus, when the rainfall amount Ra is greater than the predetermined amount D or when noise is present, each of the selected ultrasonic sensors is set to the second short distance mode where each of the selected ultrasonic sensors has the low directivity. Thus, even if the oscillation motion of the oscillation surface is reduced due to a raindrop adhering to the oscillation surface, and thereby the directivity is increased, the detection area does not easily include a road surface: In addition, a false detection in which noise is detected as a reflected wave from an obstacle by error can be reduced.

When the ECU 3 determines that the active control setting is changed, which corresponds to "YES" at S705, the process proceeds to S740. At S740, the ECU 3 determines whether the active control setting is ON. When the ECU 3 determines that the active control setting is OFF, which corresponds to "NO" at S740, the ECU 3 ends the sensor operating-mode changing process shown in FIG. 11 and each of the selected ultrasonic sensors keeps the operating mode which has already been set. When the ECU determines that the active control setting is ON, which corresponds to "YES" at S740, the process proceeds to S415.

Figure 9:
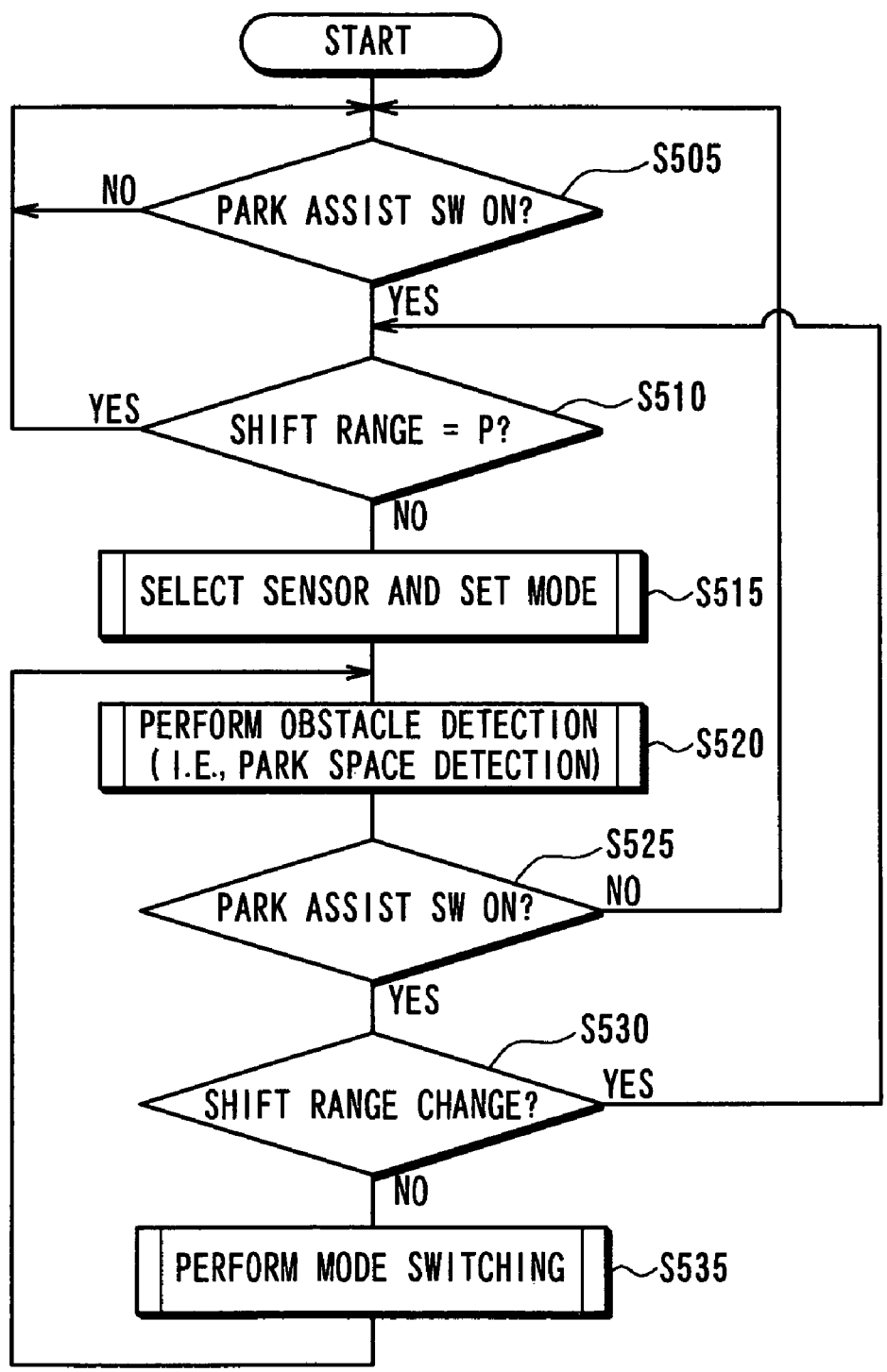
FIG. 9 is a flowchart showing a control process executed by an ECU in the obstacle detection apparatus according to the second embodiment when the parking assist system is activated.

When the processes from S705 to S740 end, the process at S535 shown in FIG. 9 ends. Then, the process returns to S520. The ECU 3 repeatedly executes the processes from S520 to S530 until the parking assist system activation switch is turned off or the shift range is changed.

In the obstacle detection apparatus 1 according to the present embodiment, when the vehicle is parked using the parking assist system, in a case where each of the selected ultrasonic sensors is not set to the long distance mode and in a case where the rainfall amount Ra is greater than the predetermined amount D or noise is present, each of the selected ultrasonic sensor is set to the second short distance mode in which the directivity is low. Thus, even when the parking assist system is used, effects similar to the effects of the first embodiment can be obtained.

Other Embodiments

Although the present invention has been fully described in connection with the exemplary embodiments thereof with reference to the accompanying drawings, it is to be noted that various changes and modifications will become apparent to those skilled in the art.

In each of the above-described embodiments, the obstacle detection apparatus 1 sets the operating mode of each of the selected ultrasonic sensors based on the rainfall amount and the presence of noise. The obstacle detection apparatus 1 may also set the operating mode of each of the selected ultrasonic sensors based on only one of the rainfall amount and the presence of noise. That is, the obstacle detection apparatus may also be configured to include only one of the rainfall amount determining portion and the noise determining portion.

In each of the above-described embodiments, the obstacle detection apparatus 1 determines the presence of noise at S430 or S725 after determining the rainfall amount at S425 or S720. The obstacle detection apparatus 1 may also determine the rainfall amount after determining the presence of noise.

In each of the above-described embodiment, the operating mode of the ultrasonic sensors $5a$-$5h$ is selected from the first short distance mode, the second short distance mode, and the long distance mode. The first short distance mode and the second short distance mode may also have different detecting distances, and the second short distance mode and the long distance mode may also have different directivities as long as the directivity in the second short distance mode is lower than the directivity in the first short distance mode. Thus, when the rainfall amount determining portion determines that the rainfall amount Ra is greater than the predetermined amount D or when the noise determining portion determines that noise is present, each of the selected ultrasonic sensors is set to the second short distance mode, in which the directivity is lower than the directivity in the first short distance mode, and thereby a false detection in which a reflected wave from a road surface or noise is detected as a reflected wave from an obstacle by error can be reduced.

What is claimed is:

1. An obstacle detection apparatus for a vehicle, comprising:
   an ultrasonic sensor configured to detect a presence of an obstacle around the vehicle and a distance to the obstacle by transmitting an ultrasonic wave and receiving the ultrasonic wave reflected by the obstacle, the ultrasonic sensor having a directivity that is variable and determines a detection area; and
   a control part including at least one of a rainfall amount determining portion and a noise determining portion, the rainfall amount determining portion configured to compare a rainfall amount with a predetermined amount, the noise determining portion configured to determine a presence of noise, wherein
   when the rainfall determining portion determines that the rainfall amount is greater than the predetermined amount or when the noise determining portion determines that noise is present, the control part outputs a command signal to the ultrasonic sensor so that the ultrasonic sensor decreases the directivity compared with a case where the rainfall determining portion determines that the rainfall amount is less than or equal to the predetermined amount or a case where the noise determining portion determines that noise is not present.

2. The obstacle detection apparatus according to claim 1, wherein:

the control part further includes a vehicle speed determining portion;

the vehicle speed determining portion is configured to compare a vehicle speed with a predetermined speed;

when the vehicle speed determining portion determines that the vehicle speed is greater than the predetermined speed, the control part outputs a command signal to the ultrasonic sensor so that the ultrasonic sensor decreases the directivity compared with a case where the vehicle speed determining portion determines that the vehicle speed is less than or equal to the predetermined speed; and when the vehicle speed determining portion determines that the vehicle speed is less than or equal to the predetermined speed, at least one of the rainfall amount determining portion and the noise determining portion makes a determination.

3. The obstacle detection apparatus according to claim 1, wherein:

the control part includes both of the rainfall amount determining portion and the noise determining portion; and when the rainfall amount determining portion determines that the rainfall amount is less than or equal to the predetermined amount and the noise determining portion determines that noise is not present, the control part outputs a command signal to the ultrasonic sensor so that the ultrasonic sensor increases the directivity compared with a case where the rainfall amount determining portion determines that the rainfall amount is greater than the predetermined amount and a case where the noise determining portion determines that noise is present.

4. A method of controlling an obstacle detection apparatus for a vehicle, comprising:

comparing a rainfall amount with a predetermined amount;

setting a directivity of an ultrasonic sensor to a first directivity when the rainfall amount is greater than the predetermined amount;

setting the directivity of the ultrasonic sensor to a second directivity when the rainfall amount is less than or equal to the predetermined amount, the second directivity being higher than the first directivity;

transmitting an ultrasonic wave from the ultrasonic sensor; and receiving the ultrasonic wave reflected by an obstacle by the ultrasonic sensor.

5. The method according to claim 4, further comprising:

determining a presence of noise;

setting the directivity of the ultrasonic sensor to the first directivity when noise is present; and setting the directivity of the ultrasonic sensor to the second directivity when the rainfall amount is less than or equal to the predetermined amount and noise is not present.

\* \* \* \* \*